F. H. OTIS.
CARBURETER.
APPLICATION FILED MAY 22, 1908.
911,153.
Patented Feb. 2, 1909.
FIG.1.
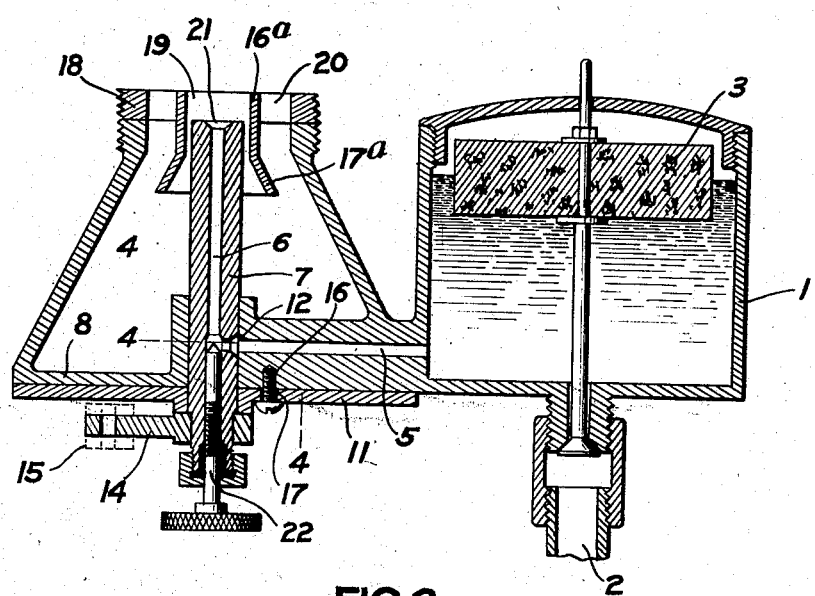
FIG.2.
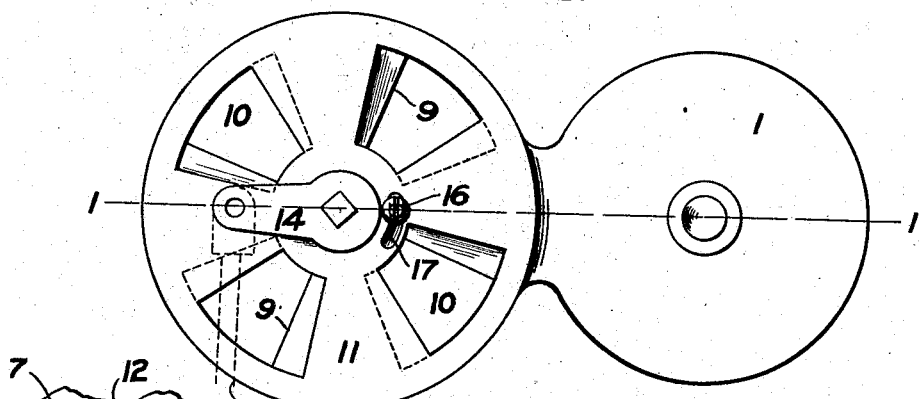
FIG.3.
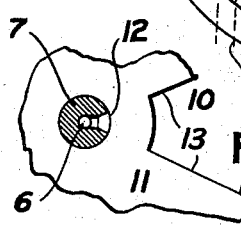
FIG.4.
WITNESSES:
Daisy Gurnee
Linda Thon
INVENTOR:
Frank H. Otis
by Osgood Davis
his attorneys

UNITED STATES PATENT OFFICE.

FRANK H. OTIS, OF ROCHESTER, NEW YORK.

CARBURETER.

No. 911,153.　　　　　Specification of Letters Patent.　　　　Patented Feb. 2, 1909.

Application filed May 22, 1908. Serial No. 434,413.

*To all whom it may concern:*

Be it known that I, FRANK H. OTIS, a citizen of the United States, and resident of Rochester, in the county of Monroe and State of New York, have invented certain new and useful Improvements in Carbureters, of which the following is a specification.

This invention relates to carbureters for explosion engines, and has for its object to adjust and maintain during operation the proper proportions of air and hydrocarbon admitted to the carbureter, and also to introduce the air to the carbureter so as to produce a complete mixture.

In the drawings:—Figure 1 is a central, vertical section of the carbureter on the line 1—1 of Fig. 2; Fig. 2 is a bottom view; Fig. 3 is a top view of part of the device; and Fig. 4 is a section on the irregular line 4—4 of Fig. 1.

Referring to the drawings, 1 is a float chamber of the familiar type, that is adapted for connection with a supply tank by the pipe 2, and in which the liquid fuel is maintained as usual, approximately at the constant level shown in Fig. 1 by the float valve 3. The float chamber 1 is connected with a mixing chamber 4 by the horizontal duct 5 that leads into the vertical duct 6 through the rotary spindle 7.

The bottom plate 8 of the mixing chamber 4 has openings 9 through it for the admission of air, that register, respectively, with corresponding openings 10 through a valve-plate 11 that is attached to the spindle 7. Accordingly air in full measure is admitted to the mixing chamber 4 when, by rotating the spindle 7, the openings 10 through the valve 11 register, respectively, with the openings 9 in the bottom 8 of the mixing chamber. And, of course, the air may be cut down to any extent desired, by the rotation of the spindle.

An important feature of the device is the means whereby the fluid supply valve controlling the flow of the fluid fuel from the float chamber to the mixing chamber is coincidently opened and closed, so that the air supply is increased and diminished with the supply of liquid fuel, and a constant ratio is maintained between them. The fuel supply valve is also operated by rotation of the spindle, for when the inlet 12 that leads to the duct 6 in the spindle is directly opposite the duct 5 that leads from the float chamber, the fluid fuel can flow freely, and as the inlet 12 is turned away from the duct 5 the flow is gradually shut off till the inlet 12 is turned entirely away from said duct 5 when the flow of the fuel is altogether shut off. In order that this fuel supply valve may operate in unison with the air valve and the fuel and air be admitted in constant ratio, either the duct 5 in the stationary connection between the float chamber 1 and the mixing chamber 4, or the duct 6 in the spindle 7, at their juncture 12, is widened so as to prolong the operation. In the drawings the duct 6 is the one enlarged at the juncture 12, and Fig. 4 shows that the opening extends in width between the points where the edges 13, 13 of the opening 10 in the rotary plate 11 would, if extended, intersect the spindle 7.

The spindle 7 and its air valve 11 are rotated by means of a lever 14 to which the operating rod 15 is attached, and the bolt 16 and slot 17 in the casing and air valve, respectively, limit the rotation of the latter. Both the lever 14 and the air valve 11 are rotatively attached to the spindle 7 by squaring the latter to receive the two former.

Other novel features of the carbureter are found in the construction of the passages through which the air is conducted through the carbureter to mix with the hydrocarbon.

The interior of the mixing chamber 4 is conical in form, narrowing towards the open end of the spindle 7. Depending from the open mouth of this conical chamber, and surrounding the end of the spindle 7, is a tube 16 that has a flaring extension 17ª. This tube 16ª is attached to a plate 18 that rests upon the mixing chamber 4, while a central opening 19 and circumferential openings 20 afford passages for the mixture and air, respectively. Thus the air as it enters the mixing chamber 4 through the valve 11 is conducted by the inwardly tapered wall to the open end of the spindle 7, where it is divided, part passing between the mixing chamber and the depending tube 16, and part passing between said tube 16 and the spindle 7.

The fluid normally stands in the spindle 7 at the level of the fluid in the float chamber 1, which, as shown in Fig. 1, is below the outlet 21 of the spindle 7, but the converging walls of the mixing chamber 4 and tube 16 increase the velocity of the air that passes between the tube and the spindle 7, so that it is able to suck the fluid out from the spindle 7. Again, the air that passes out between the wall of the mixing chamber and the tube 16, and thence through the openings 20 in the plate 18, is focused upon the mixture issuing from the central opening 19 in said plate 18, and in consequence produces a thorough mixture of air and hydrocarbon vapor.

This form of carbureter, therefore, by concentrating and accelerating the air in its passage over the liquid discharge duct makes it possible to maintain the liquid at a lower level in said discharge duct than is usual, and so to prevent overflowing while the engine is shut down, which is a fault common to most constructions.

In order that the fluid may be shut off without disturbing the position of the spindle when it has been set at the proper point for the usual requirements, a needle valve 22 may also be used that is inserted through the spindle 4 into the duct 5.

What I claim is:—

1. A carbureter comprising a chamber having an air inlet, a valve bearing and a lateral fuel supply passage intersecting said bearing, a jet nozzle mounted to turn in said bearing and having a duct in its bearing portion to register with said supply passage when the nozzle is turned, and an air valve carried by the nozzle to turn therewith; whereby the fuel passage and air inlet will be opened and closed simultaneously and in the same degree.

2. A carbureter comprising a chamber having an air inlet, a valve bearing and a lateral fuel passage intersecting said bearing, a valve-forming jet nozzle extending through and turning in said bearing and having its longitudinal bore provided with a lateral duct to register with said supply passage when the nozzle is turned in the bearing, a needle valve in the lower end of the nozzle bore and controlling the flow from the said duct, and an air valve carried by and turning with the said nozzle.

3. A carbureter comprising a chamber having a series of air inlets, a rotary valve-forming fuel supply nozzle mounted in the chamber centrally of said air inlets and having a duct below its upper discharge end; said chamber having a fuel passage closed by said rotary nozzle and adapted to communicate through said duct with the bore of the nozzle when the nozzle is rotated, and an air valve carried by and turning with the nozzle; whereby the liquid passage and the air inlets are opened and closed simultaneously and in the same degree.

4. A carbureter comprising a conical mixing chamber provided within its apex with a conical spaced tube, and having air inlets in its base, a combined nozzle and valve mounted to rotate in the base with its upper discharge end extending within and spaced from said conical tube and provided between its ends with a lateral duct; said chamber having a supply passage adapted to register with the said lateral duct, and an air valve mounted on the lower end of said rotary nozzle to turn therewith.

FRANK H. OTIS.

Witnesses:
D. GURNEE,
L. THON.